United States Patent [19]

Sternberg et al.

[11] Patent Number: 5,583,585

[45] Date of Patent: Dec. 10, 1996

[54] PROTECTIVE COVER FOR EYEGLASS TEMPLE PIECES AND METHOD OF MAKING THE SAME

[75] Inventors: Gerd Sternberg; Noreen G. Sternberg, both of Las Vegas, Nev.

[73] Assignee: Gan Enterprises, Inc., Las Vegas, Nev.

[21] Appl. No.: 184,234

[22] Filed: Jan. 19, 1994

[51] Int. Cl.⁶ ...................................................... G02C 5/14
[52] U.S. Cl. .................................................................. 351/122
[58] Field of Search ....................................... 351/111, 122

[56] References Cited

U.S. PATENT DOCUMENTS

| | | | |
|---|---|---|---|
| 1,622,668 | 3/1927 | Poeton et al. | 351/122 |
| 1,810,220 | 6/1931 | Nelson | 351/122 |
| 2,259,082 | 10/1941 | Ring | 351/122 |
| 2,294,840 | 9/1942 | Dunn | 351/122 |
| 2,436,101 | 2/1948 | Dirlam et al. | 351/122 |
| 2,502,734 | 4/1950 | Lyons | 351/122 |
| 3,156,757 | 11/1964 | Spina | 351/122 |
| 3,684,356 | 8/1972 | Bates | 351/123 |
| 3,993,403 | 11/1976 | Brown | 351/178 |
| 4,786,158 | 11/1988 | Barfus-Shanks et al. | 351/122 |
| 5,201,856 | 4/1993 | Edwards | 2/209 |

FOREIGN PATENT DOCUMENTS 0305281   3/1989   European Pat. Off. ............... 351/111

Primary Examiner—William L. Sikes
Assistant Examiner—Huy Mai
Attorney, Agent, or Firm—John C. Lambertsen

[57] ABSTRACT

In accordance with the invention, there is provided an eyeglass temple piece protector that is prepared with a first elongate strip of plastic material superposed on a second elongate strip of plastic material to form a hollow sleeve. The sleeve has a front side, a back side, a closed end, and an open end. The sleeve is further adapted to receive a temple piece of a pair of eyeglasses from the open end to the closed end. The front side of the sleeve extends beyond the backside of the sleeve to form a flange at the open end. Also provided in accordance with the invention is a method to manufacture an eyeglass temple protector. In the method a first and second sheet of plastic material, each sheet having a length, a width, and an edge are provided. The first sheet is superposed on the second sheet such that the edge of the first sheet is parallel to, but not flush with, the edge of the second sheet, so that a flange is formed in the second sheet. The first sheet is sealed to the second sheet across the respective widths at regular intervals along the respective lengths to form a plurality of seals defining hollow sleeves having an open end at the flange that are separable along a parallel line proximate and adjacent to the seals. A closed end is formed in the sleeves at an end opposite the open end.

18 Claims, 3 Drawing Sheets

PROTECTIVE COVER FOR EYEGLASS TEMPLE PIECES AND METHOD OF MAKING THE SAME

BACKGROUND OF THE INVENTION

A. Field of the Invention

This invention relates generally to eyeglass temple protectors, and more particularly, to such temple protectors that act as protective covers on the temple pieces of eyeglasses.

B. Description of the Prior Art

Eyeglasses are worn by a large proportion of the populace. Many problems and inconveniences have been experienced by eyeglass wearers, among which are those encountered due to the interaction between the temple piece of eyeglasses and the wearer. A number of different designs and devices have been proposed to alienate one or more of these problems. A relatively more recent concern has been the covering of eyeglass temples to avoid their contact with chemicals that might prove harmful or damaging to the temple material.

U.S. Pat. No. 4,768,158, for example, discloses removable covers for eyeglass temples that protect the temple pieces from chemical treatments. In particular, the temple covers of the patent are designed to protect the glasses from beauty parlor hair treatments, permitting the wearer of the glasses to continue to wear the glasses during the procedure. The patent also discloses a variety of other structures that have been used in the art to provide coverings for eyeglass temples or the "boots" that contact the ears. The disclosure of U.S. Pat. No. 4,768,158 is hereby incorporated by reference.

However, the solutions provided by the prior art to protect eyeglass temple pieces have been either relatively complicated or relatively expensive to manufacture. Accordingly, there remains therefore a need in the art for a disposable, inexpensive, easy to install, and easy to remove temple cover that, by its construction, will accommodate a wide variety of eyeglass temple piece structures and configurations. In accordance with this need, it is an object of the present invention to provide an improved temple protector that is simple to apply, use, and inexpensive to manufacture. It is a further object of the present invention to provide a method to manufacture the improved temple protector.

SUMMARY OF THE INVENTION

In certain situations there is a need to protect the temples of eyeglasses from the environment (chemical treatments to the hair or head), as discussed above, or, as we have now discovered, users of the eyeglasses from the passage of disease (in optometric or ophthalmologic offices). In these and similar situations, it would be beneficial to provide a disposable, inexpensive, easily installed, and removed temple cover that will protect the temple piece against its environment.

The present invention improves upon the prior art by providing a temple protector that is easily manufactured and more readily affixed to the glasses than temple protectors in the art. Such an ease of affixation is accomplished by the present invention by certain steps taken in the manufacture of the inventive the temple protectors. The material used in forming the temple protector is folded over on one side of the open end of the temple protector, causing the opening to be more easily accessible. Further, in a preferred embodiment of the invention, an indicator is placed on the non-folded material so that the user can more readily distinguish the "open" from the "closed" end, and, preferably, the front from the back as well.

Further the invention provides a novel process of manufacture of temple protectors that better meet the needs in the art. In the process, a sheet of plastic of an appropriate length and width is folded over, upon itself, in half. Thereafter, in a preferred embodiment a short segment of the material is folded back upon itself, and in the opposite direction, to form a cuff. The plastic can then be sealed, across the width, to form the individual temple protectors. Typically, sealing is accomplished using heat sealing. Moreover, the blade used in heat sealing should be wide enough or hot enough to sufficiently score the plastic so that the individual temple protectors formed in the process may be easily separated from one-another when in use.

In accordance with a first aspect of the present invention there is provided an eyeglass temple protector, which comprises a first elongate strip of plastic material superposed on a second elongate strip of plastic material, forming a hollow sleeve, the sleeve having a front side, a back side, a closed end, and an open end, the sleeve being further adapted to receive an individual temple piece of a pair of eyeglasses from the open end to the closed end, and wherein the back side extends beyond the front side to form a flange at the open end. In a preferred embodiment, the back side further comprises a cuff of the material that folds back from the open end towards the closed end. In another preferred embodiment, the flange further comprises indicator means to allow a user to differentiate between the open end and the closed end.

In accordance with a second aspect of the present invention there is provided a method to make an eyeglass temple protector, comprising providing a first and second sheet of plastic material, each sheet having a length, a width, and an edge, superposing the first sheet on the second sheet such that the edge of the first sheet is parallel to, but not flush with, the edge of the second sheet, wherein a flange is formed in the second sheet, sealing the first sheet to the second sheet across the respective widths at regular intervals along the respective lengths, to form a plurality of seals defining hollow sleeves, that are separable along a parallel line proximate and adjacent to the seals, each having an open end at the flange, and forming a closed end in the sleeves at an end opposite the open end. In a preferred embodiment, in the providing step, the first sheet and the second sheet are in the form of a single master sheet having a width and the superposing step comprises folding the master sheet at an increment less than half the width of the master sheet so as to form the flange.

In another preferred embodiment, the closed end forming step is accomplished in the superposing step. In another preferred embodiment, the sealing step is accomplished with heat sealing. Preferably, heat sealing is accomplished at a sufficiently high temperature to allow the respective sleeves to be selectively separable along the seals.

In another preferred embodiment, two distinct sheets of material are used as the first and second sheet in the providing step and the closed end forming step further comprises a second sealing step wherein a seal is formed between the first sheet and the second sheet, along the length of the sheets. In this embodiment, the second sealing step is preferably accomplished with heat sealing.

In another preferred embodiment, the superposing step further comprises forming a cuff in the first sheet by folding the first sheet back onto itself and away from the edge of the second sheet, creating the flange.

Further objects and advantages of the invention may best be understood by reference to the following description taken in conjunction with the accompanying drawings.

DETAILED DESCRIPTION OF THE PREFERRED EMBODIMENTS

The present invention is useful in environments where either the head, scalp, or hair of a person is treated with chemicals or where it is desirable to reduce the opportunity for the transmission of disease. In the first situation, which may occur in beauty parlors and certain doctors offices, people who wear glasses may undergo a hair or scalp treatment involving the use of chemicals. Oftentimes such chemicals must remain on the hair or scalp for an extended period of time if the person were to wear their glasses during this "treatment" time, the chemical treatment could be damaging to the glass frame material, and particularly to the temple pieces, since these are in such close association with the hair. Similarly, patients being treated by a dermatologist or other physicians who treat disorders of the scalp or head dermatology may require the patient to remain at the facility for extended periods of time while an applied substance is present on the skin and/or in the hair in the region of the eyeglass temple piece. Often, such substances tend to drip or run down the patient's skin or hair onto the eyeglass temple piece. Some hardship would be imposed upon the patient or client if the treatment time cannot be passed by reading or watching television, for example.

In the second situation, disease prevention, the present invention is expected to provide additional safety to patients in ophthalmologists or optometrist offices when having their eyes checked. A doctor can easily slide the disposable temple protectors of the present invention over the temple pieces of the test glasses or frames that the person is trying on, thus providing a more sterile and aseptic environment.

Figure 1:
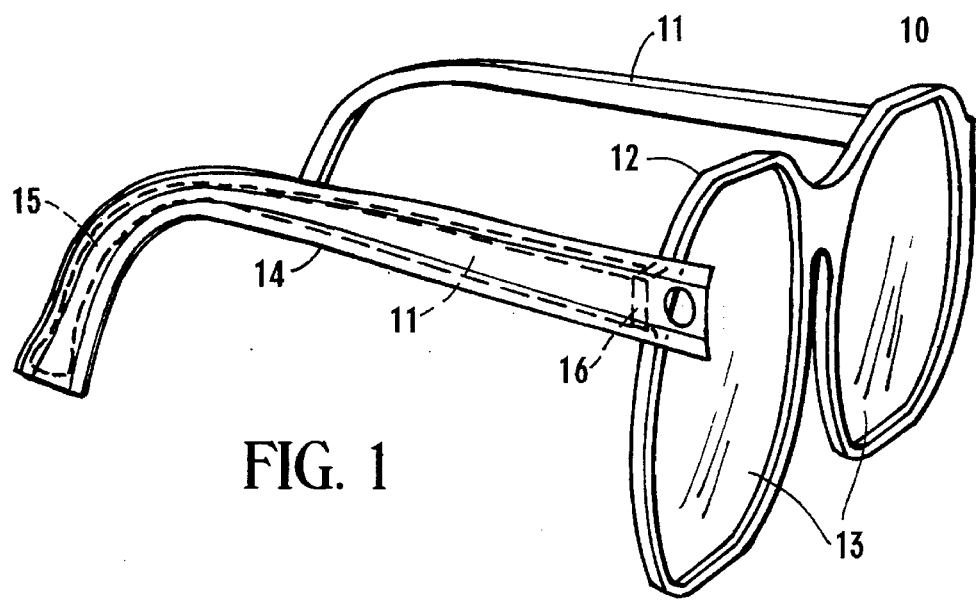
FIG. 1 is a perspective view, with portions in phantom, showing a pair of eyeglasses having a temple protector constructed in accordance with the present invention inserted thereon.

These facets of the present invention are enabled by the temple protectors of the present invention. Referring now to FIG. 1, there is a provided pair of eyeglasses 10 having a temple protector constructed in accordance with the present invention inserted thereon. As will be noticed, the glasses 10 have a pair of temple pieces 11 and a frame 12 that contains a pair of lenses 13. A temple protector 14, which is constructed as a long thin hollow sleeve, is simply inserted and slidably mounted over an ear piece 15 on one of the temple pieces 11 toward a hinge 16, which is formed between the frame 12 and the temple pieces 11.

Figure 2:
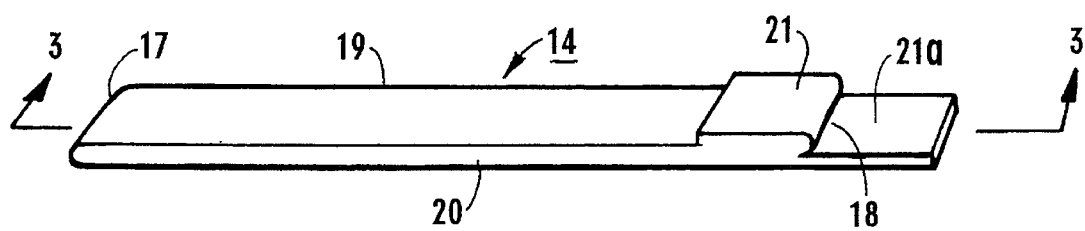
FIG. 2 is a top perspective view of a temple protector constructed in accordance with the present invention.

Further details of the temple protector 14 are shown in FIG. 2. The temple protector 14 is preferably formed of a thin plastic material. A preferred plastic material is polyethylene film of approximately 1.5 mil. (0.0015 inch) thickness, having a sealing temperature of approximately 250° F. Such a plastic is believed to be readily available, one possible source is Bradley's Plastic Bag Co., of Downey, Calif. 90241. When lying on a flat surface the temple protector is preferably a simple flat sleeve of two materials having a closed end 17, an open end 18, and a first edge 19 and a second edge 20. In the preferred embodiment, the temple protector 14 further includes a cuff 21.

The cuff 21 assists in at least four valuable aspects in the present invention. First, the cuff 21 assists the user in determining which end is the open end 18. Further, the cuff 21 adds additional rigidity to the temple protector 14, aiding in preventing the temple protector 14 from being torn when a temple from a pair of eyeglasses is inserted (not shown in FIG. 2) and the temple protector 14 is slipped toward the hinge on a pair of glasses (also not shown in FIG. 2). The cuff 21 also aids the user in obtaining access to the open end 18, providing additional material in the first and second edges 19, 20 respectively. This allows the user to squeeze the first and second edges 19, 20 toward one another, opening the open end 18. Finally, the cuff 21 also provides a space that will not interfere with the hinge (FIG. 1) of the glasses. Although not required, a hinge flange 21a may be of sufficient length to extend past the hinge 16 and cover a portion of the frame 12 as is shown in FIG. 1. The cuff 21 keeps the material recessed from the hinge 16. Consequently, the temple protector 14 will stay in position on the temple piece 11 without sliding back towards the ear of a wearer (not shown).

Several of the advantages attained through use of the cuff 21 can also be achieved by merely providing the hinge flange 21a. For example, the user will still be able to better distinguish the open end 18 and the temple protector 14 will better stay in position on the temple piece 11 (FIG. 1). Therefore, the cuff 21 can easily be eliminated. However, use of the cuff 21 is preferred due to its providing superior strength and easier insertion.

As will be appreciated, the temple protector 14 can be of any length. All that is required is that the temple protector 14 cover a sufficient portion of the temple 11 of a pair of eyeglasses 10 to attain the protection desired. For example, where only aseptic controls are required (as in optometrist and ophthalmologists offices), it may often be sufficient that the temple protector 14 only cover the ear piece 15 (FIG. 1). However, in beauty parlors and similar applications, it is preferable that the temple protector 14 cover the entire temple piece 11 (FIG. 1) of a pair of eyeglasses 10. Preferably, the temple protector 14 is between 5 and 20 cm. More preferably, the temple protector 14 is between 10 and 15 cm. In the preferred embodiment, the temple protector is between 13 and 14 cm.

Figure 3:
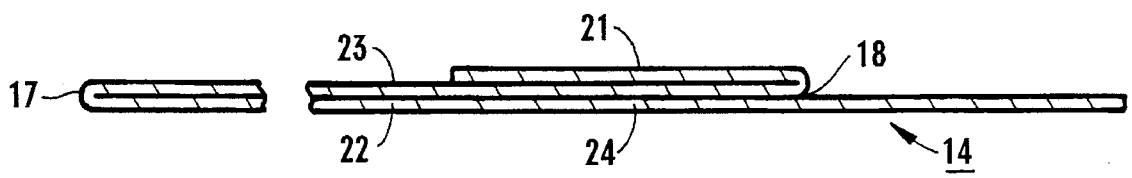
FIG. 3 is a cross-sectional side view taken along line 3—3 of FIG. 2, with portions omitted, showing the open end of a temple protector constructed in accordance with a preferred embodiment of the present invention.

The structure of the temple protector 14 of the present invention, and the cuff 21 in particular, will be better understood with reference to FIG. 3. Preferably the temple protector 14 is manufactured from a single sheet of plastic folded over onto itself and heat-sealed at regular intervals to define respective hollow sleeves. Alternatively, two sheets of plastic are used. In either case, the sleeves defining the temple protector 14 of the present invention, therefore, include a back strip 22 and a front strip 23. In manufacture, the front strip 23 is preferably folded over or placed upon the back strip 22. Upon sealing, a void 24 will remain between the back strip 22 and the front strip 23, and will extend from the open end 18 to the closed end 17. Where a single sheet is used, the closed end 17 will be formed without additional sealing. Where, however, two sheets of material are used, the closed end must be formed through an additional sealing step.

In addition, in the preferred embodiment, the front strip 23 is folded over onto itself to form the cuff 21. Typically, the cuff is relatively short (i.e., between 1 to 3 cm.)

Figure 4A:
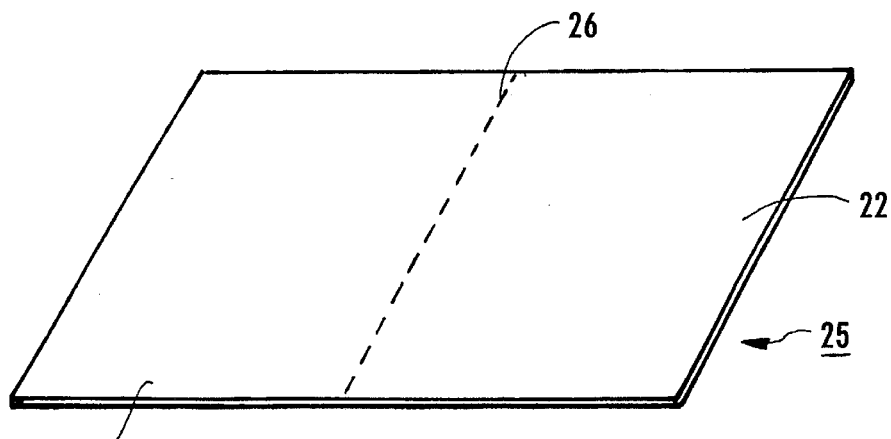
FIGS. 4a through 4e are a schematic of the steps used in a preferred method of manufacture of the temple protectors in accordance with the present invention.

FIGS. 4a through 4e are a schematic of the steps used in a preferred method of manufacture of the temple protectors 14 in accordance with the present invention. In FIG. 4a, it will be observed that, in this case, a single sheet of material 25 is being used to prepare the temple protectors of the present invention. As discussed above, two sheets can just as easily be used. A dotted line 26 is used to depict an approximate mid-point for the sheet of material 25. The sheet of material 25 will be folded along mid-point line 26, thereby forming the back strip 22 on the right-hand side of the line 26 and the front strip 23 on the left-hand side of the line 26.

Figure 4B:
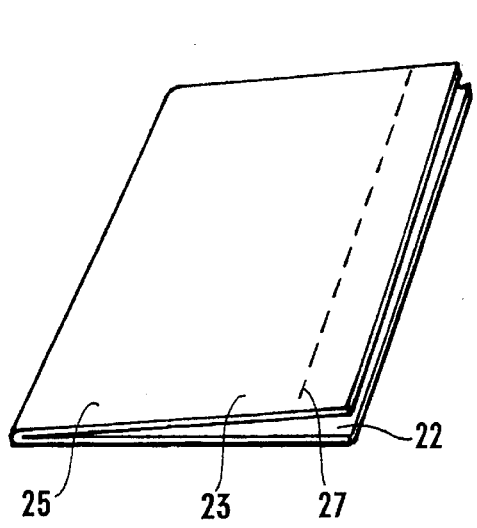
Figure 4C:
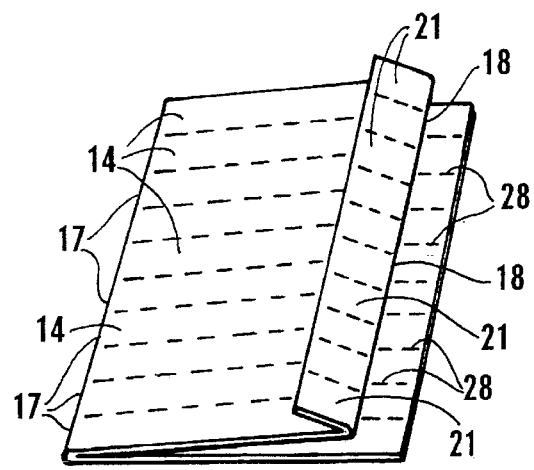

The material 25 is shown in FIG. 4b after the folding step, wherein the back strip 22 and the front strip 23 are formed. As mentioned above, a cuff 21 is preferably formed near what will become the open end 18. This is accomplished by folding the front strip 23 of the sheet of material 25 along a second dotted line 27. The result of this second fold step will be seen in FIG. 4c. Thereafter, the sheet of material 25 can be sealed at intervals along, for example, sealing lines 28 to form individual temple protectors 14 having respective closed ends 17, open ends 18, and cuffs 21.

Sealing is preferably accomplished with heat. There are a variety of commercially available heat sealing devices that allow a user to quickly seal plastic materials. Preferably, the blade or element of the heat sealer is either large enough or operated at a high enough temperature that the sealing operation makes the respective temple protectors 14 easily separable. The inclusion of perforations between the individual temple protectors is also viewed as a preferred method for providing easy separability between adjoining temple protectors.

As will be appreciated there are a variety of sealing methods that can be used without departing from the scope of the invention. For example, in the plastic sealing art, adhesives and plastic welding, particularly, ultrasonic welding, can be used with equal success. Heat sealing is presently preferred because of its relative ease and cost-effectiveness.

Figure 4D:
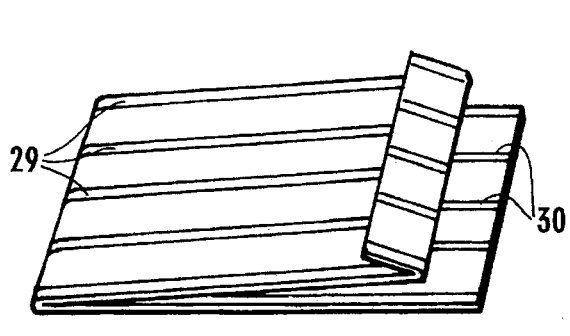

In an alternate embodiment, two seals could be made for each temple protector 14 along lines 29, as is illustrated in FIG. 4d. Cuts could subsequently be made or perforations formed at positions 30, between the respective temple protectors.

Figure 4E:
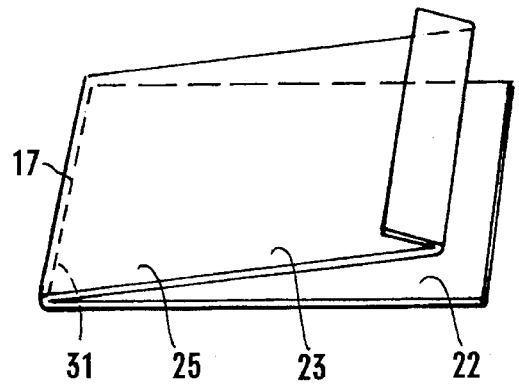

In FIG. 4e, as will also be appreciated, where two separate sheets of material are used as the front strip 23 and the back strip 24, it is additionally necessary to form an additional seal, longitudinally across the material 25 and along a bottom line 31, to form the closed end 17. This can be accomplished either before or after performing the lateral sealing that is employed to form the temple protectors. In FIG. 4e, the longitudinal sealing to form the closed end is being performed prior to performing the lateral sealing.

Figure 5:
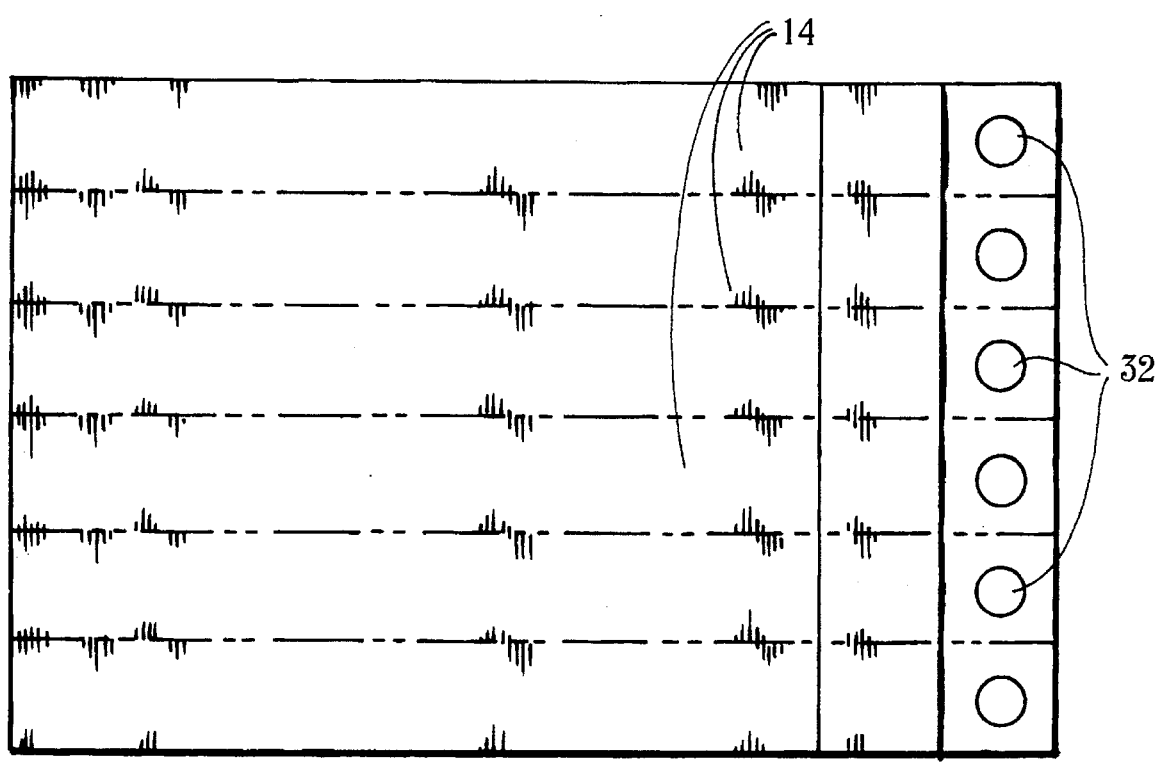
FIG. 5 is a top plan view showing a plurality of temple protectors constructed in accordance with the present invention.

Referring now to FIG. 5, the result of the manufacturing process described in FIGS. 4a through 4e is shown. These particular individual temple protectors 14 are additionally fitted with an open end indicator 32. The indicators assist a user by permitting a rapid determination as to which end is the open end. Preferably, the indicators are colored tabs that are placed on during the manufacturing process, and most preferably, each side of the indicator is provided with a different color or shade, permitting the user to rapidly locate the open end 18 by identifying not only the correct end of the temple protector 14, but the correct side as well. In the alternative, the indicators can be painted on or can be scored into the material. An example of scoring would be forming a perforation in the material so that the user could easily feel the open end, even if the opening in a thin transparent plastic was not particularly easy to see.

As can also be appreciated by those skilled in the art, the temple protectors manufactured in accordance with the present invention can also be formed and packaged in formats other than the sheetform style of FIG. 5.

While particular embodiments of the invention have been shown and described, it will be apparent to those skilled in the art that changes and modifications may be made without departing from the invention in its broader aspects, and, therefore, the aim in the appended claims is to cover all such changes and modifications as fall within the true spirit and scope of the present invention.

What we claim is:

1. An eyeglass temple protector, comprising:

a first elongate strip of plastic material superposed on a second elongate strip of plastic material and forming a hollow sleeve, the sleeve having a front side, a back side, a closed end, and an open end, the sleeve being further adapted to receive a temple piece of a pair of eyeglasses from the open end to the closed end, and wherein the front side further comprises a cuff of the material that folds back from the open end towards the closed end, and the back side extends beyond the front side to form a flange at the open end.

2. The temple protector of claim 1, wherein the flange further comprises indicator means to allow a user to differentiate between the open end and the closed end.

3. The temple protector of claim 2, wherein said indicator means comprises a colored tab.

4. The temple protector of claim 3, wherein said colored tab has a first side and a second side, with said first side and said second side differing from one another in color.

5. The temple protector of claim 2, wherein said indicator means comprises a scored indicia in the plastic material.

6. The temple protector of claim 5, wherein said indicator means comprises a perforation in the plastic material.

7. A method to make an eyeglass temple protector, comprising:

providing a first and second sheet of plastic material, each sheet having a length, a width, and an edge;

superposing the first sheet on the second sheet and forming a cuff in the first sheet by folding the first sheet back onto itself and away from the second sheet, wherein a flange is formed in the second sheet;

sealing the first sheet to the second sheet across the respective widths at intervals along the respective lengths to form a plurality of seals defining hollow sleeves having an open end at the flange that are separable along a parallel line proximate and adjacent to the seals; and forming a closed end in the sleeves at an end opposite the open end.

8. The method of claim 7, wherein in the providing step, the first sheet and the second sheet are in the form of a single master sheet having a width and the superposing step comprises forming the cuff in the front sheet by folding an upper edge of the master sheet back onto the master sheet and away from an upper edge of the second sheet so as to form the flange.

9. The method of claim 8, wherein the closed end forming step is accomplished in the superposing step.

10. The method of claim 7, wherein the sealing step is accomplished with heat sealing.

11. The method of claim 10, wherein heat sealing is accomplished at a sufficiently high temperature to allow the respective sleeves to be separable along the seals.

12. The method of claim 7, wherein two distinct sheets of material are used as the first and second sheet in the providing step and the closed end forming step further comprises a second sealing step wherein a seal is formed between the first sheet to the second sheet along the length of the sheets.

13. The method of claim 12, wherein the second sealing step is accomplished with heat sealing.

14. The method of claim 2, and further comprising:
 fitting each said flange of said plurality of hollow sleeves with an open end indicator.

15. The method of claim 14, wherein colored tabs are placed on each of said flanges of said plurality of hollow sleeves.

16. The method of claim 14, wherein paint is applied to each of said flanges of said plurality of hollow sleeves.

17. The method of claim 7, and further comprising scoring each of said flanges of said plurality of hollow sleeves to provide an open end indicator.

18. The method of claim 17, wherein each of said flanges of said plurality of hollow sleeves is perforated.

\* \* \* \* \*